United States Patent
Casset et al.

(10) Patent No.: US 11,921,958 B2
(45) Date of Patent: Mar. 5, 2024

(54) HAPTIC INTERFACE

(71) Applicant: COMMISSARIAT A L'ENERGIE ATOMIQUE ET AUX ENERGIES ALTERNATIVES, Paris (FR)

(72) Inventors: Fabrice Casset, Grenoble (FR); Angélique Rascle, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/456,602

(22) Filed: Nov. 26, 2021

(65) Prior Publication Data
US 2022/0164043 A1 May 26, 2022

(30) Foreign Application Priority Data
Nov. 26, 2020 (FR) ...................................... 20 12213

(51) Int. Cl.
*G06F 3/043* (2006.01)
*G06F 3/041* (2006.01)

(52) U.S. Cl.
CPC ............ *G06F 3/043* (2013.01); *G06F 3/0416* (2013.01); *G06F 2203/04103* (2013.01)

(58) Field of Classification Search
CPC .......... G06F 3/016; G06F 3/011; G06F 3/043; G01C 21/3652
See application file for complete search history.

(56) References Cited

U.S. PATENT DOCUMENTS 5,870,351 A * 2/1999 Ladabaum ............. H02N 1/006
    381/174
6,262,946 B1 * 7/2001 Khuri-Yakub ........ B06B 1/0292
    381/174

(Continued)

FOREIGN PATENT DOCUMENTS

FR      3 092 680 A1    8/2020
SE       1950931 A1    11/2019

OTHER PUBLICATIONS

French Preliminary Search Report dated Jul. 30, 2021 in French Application 20 12213 filed on Nov. 26, 2020, 3 pages (with English Translation of Categories of Cited Documents).

(Continued)

*Primary Examiner* — Olga V Merkoulova
(74) *Attorney, Agent, or Firm* — Oblon, McClelland, Maier & Neustadt, L.L.P.

(57) ABSTRACT

A haptic interface of the 'mid-air' type, including a control circuit, a plurality of ultrasonic transducers connected to the circuit, which includes a first set of transducers emitting at a first ultrasound carrier frequency and at least a second set of transducers emitting at a second ultrasound carrier frequency different from the first; the control circuit being configured for modulating the signals sent to the transducers in order to generate, with the ultrasound waves emitted by at least a part of the transducers of the first set, an acoustic pressure detectable by touch within at least a first focal region, and generate, with the ultrasound waves emitted by at least a part of the transducers of the second set, an acoustic pressure detectable by touch within at least a second focal region.

14 Claims, 9 Drawing Sheets

(56) References Cited

U.S. PATENT DOCUMENTS

| | | | | |
|---|---|---|---|---|
| 8,767,512 | B2* | 7/2014 | Hajati | G01S 15/8952 367/140 |
| 9,647,195 | B2* | 5/2017 | Hajati | G01S 15/8915 |
| 9,656,300 | B2* | 5/2017 | Yamamoto | B06B 1/0622 |
| 9,660,170 | B2* | 5/2017 | Hajati | H01L 41/042 |
| 9,977,120 | B2* | 5/2018 | Carter | G01S 7/52004 |
| 10,755,538 | B2* | 8/2020 | Carter | G08B 6/00 |
| 2007/0164631 | A1* | 7/2007 | Adachi | G01N 29/245 310/311 |
| 2008/0013405 | A1* | 1/2008 | Moon | B06B 1/0629 367/92 |
| 2010/0268058 | A1* | 10/2010 | Chen | A61B 8/4483 600/407 |
| 2010/0327695 | A1* | 12/2010 | Goel | B06B 1/0611 310/320 |
| 2012/0176002 | A1* | 7/2012 | Kim | H04R 3/04 310/317 |
| 2013/0293065 | A1* | 11/2013 | Hajati | B06B 1/0629 310/334 |
| 2013/0294201 | A1* | 11/2013 | Hajati | G01N 29/2406 310/334 |
| 2013/0294202 | A1* | 11/2013 | Hajati | G01S 15/8952 310/366 |
| 2014/0117812 | A1* | 5/2014 | Hajati | A61B 18/082 310/314 |
| 2014/0269204 | A1* | 9/2014 | Hajati | G01S 15/8915 367/137 |
| 2015/0192995 | A1* | 7/2015 | Subramanian | G06F 3/016 340/407.1 |
| 2017/0153707 | A1 | 6/2017 | Subramanian et al. | |
| 2018/0181203 | A1* | 6/2018 | Subramanian | G01C 21/3652 |
| 2018/0361174 | A1* | 12/2018 | Radulescu | A61N 7/02 |
| 2019/0038496 | A1* | 2/2019 | Levesque | A61H 23/0245 |
| 2019/0364362 | A1 | 11/2019 | Subramanian et al. | |
| 2021/0195332 | A1 | 6/2021 | Subramanian et al. | |

OTHER PUBLICATIONS

Qui et al., "Piezoelectric Micromachined Ultrasound Transducer (PMUT) Arrays for Integrated Sensing, Actuation and Imaging", Sensors, vol. 15, No. 4, 2015, 22 pages, XP055309471.

Casset et al., "Piezoelectric membrane actuator design.", 2011 12th Intl. Conference on Thermal, Mechanical & Multi-Physics Simulation and Experiments in Microelectronics and Microsystems, IEEE, 2011, 5 pages.

* cited by examiner

HAPTIC INTERFACE

TECHNICAL FIELD

The present invention relates to human-machine interfaces, and more particularly to those using haptic effects.

PRIOR ART

A haptic interface allows the user to interact with the environment via the sense of touch. The haptic effect is currently increasingly used in numerous applications, notably for virtual or augmented reality devices.

The use of a matrix of ultrasonic transducers excited at a frequency higher than 20 kHz, referred to as carrier frequency, is known for generating a plurality of ultrasound waves which, being inaudible, are focused by adjusting the phase shift of the carriers into a predefined spatial region, in order to generate an acoustic pressure. The latter is detectable to the touch by virtue of a low-frequency modulation of the amplitude of the carriers.

This technology generating an effect at a distance allows for example a better immersion in video games, notably via the addition of haptic effects during the use of virtual reality (VR), augmented reality (AR) or mixed reality (MR) glasses. It may also be applied to the functionalization of dashboards, notably in automobiles, by allowing the driver to obtain touch-sensitive information while at the same time keeping their attention on the road.

The application US20180181203A1 discloses a haptic interface allowing a haptic effect to be generated on the hand of a user by virtue of a matrix of ultrasonic transducers whose carrier frequencies are identical, but whose low-frequency modulation frequencies are different, in order to excite different touch receptors sensitive to different excitation frequencies and to thus create a multipoint haptic effect.

The application FR3092680A1 describes a virtual reality device comprising a frame designed to be worn on the head of a user and comprising a plurality of identical transducers of the piezoelectric micro-machined ultrasound transducer (PMUT) type generating a haptic effect on the hand of the user.

The existing haptic interfaces use matrices of identical transducers emitting at the same carrier frequency.

It is relatively difficult to complexify the haptic effects obtained with such transducers.

DESCRIPTION OF THE INVENTION

There accordingly exists a need for further improvement of the haptic interfaces of the 'mid-air' type, notably so as to obtain an interface allowing various relatively complex haptic effects to be more easily generated, if this is desired.

SUMMARY OF THE INVENTION

The invention aims to meet this need and it achieves this, according to a first of its aspects, by virtue of a haptic interface of 'mid-air' type, comprising:
 a control circuit,
 a plurality of ultrasonic transducers connected to said circuit, which includes a first set of transducers emitting at a first ultrasound carrier frequency and at least a second set of transducers emitting at a second ultrasound carrier frequency different from the first;
 the control circuit being configured for modulating the signals sent to the transducers, in order to:

generate, with the ultrasound waves emitted by at least a part of the transducers of the first set, an acoustic pressure detectable by touch within at least a first focal region, and generate, with the ultrasound waves emitted by at least a part of the transducers of the second set, an acoustic pressure detectable by touch within at least a second focal region.

The term 'focal region', sometimes also referred to as 'focal point', denotes the region where the ultrasound waves are concentrated and generate a detectable acoustic pressure. This focal region may be a more or less extensive region of space, depending on the desired objective.

The invention simplifies the creation of complex haptic effects since, by way of its construction, the interface allows effects to be generated within regions situated at different distances and/or of different extents due to the different carrier frequencies.

The control circuit is preferably configured so as to calculate phase shifts to be introduced into the carriers of the various ultrasound waves emitted by the transducers actuated, and to generate these phase shifts so as to concentrate the ultrasound waves emitted within predefined focal regions.

The control circuit may receive data from equipment defining the haptic effect(s) to be generated, as a function for example of the position of the hand of the person for whom this effect is intended relative to the transducers. The control circuit may be configured in such a manner as to determine which transducers are to be actuated and the signals to be sent with the latter according to the desired haptic effect(s).

Preferably, the first focal region is different from the second. The focal regions may be located at different positions in space and/or be of different sizes.

Preferably, the first and second carrier frequencies are separated by at least 10 kHz, or better by at least 20 kHz, or even better by at least 30 kHz, which allows haptic effects relatively distant from one another or of quite different extents to be obtained without having to modulate the power of the transducers.

The transducers may be configured to operate at different carrier frequencies in several ways. For a given transducer, the frequency of the carrier may correspond to the resonance frequency of the transducer. For example, the size of the transducers or the materials employed may be varied, these two parameters having an effect on the resonance frequency. For example, the transducers of the first set and those of the second set have active membranes of different sizes, preferably fabricated in an identical manner, notably with the same material or materials. This simplifies the fabrication of the transducers by allowing, if it is desired, a plurality of transducers to be simultaneously fabricated, for example on the same substrate, some of which have a given membrane size and others have a different size. The transducers having the largest active membrane may emit at the lowest carrier frequency.

The transducers of the first set and those of the second set may be amplitude modulated at an identical low frequency or, as a variant, at different frequencies.

The low frequency of modulation of the carriers is preferably in the range between 10 Hz and 5 kHz, or better between 50 Hz and 500 Hz.

The transducers of the first set may be grouped in various ways, notably according to one or more subsets, as may those of the second set, depending on the effects that it is sought to generate.

Preferably, the transducers of the first and second sets are carried by the same substrate, all having one of their ends situated in the same plane for example. This substrate may be rigid or flexible, and may for example take various configurations, notably concave or convex, depending on the effects sought.

The interface may comprise at least a third set of transducers emitting at an ultrasonic carrier frequency different from those of the first and second sets.

The interface is not limited to a particular number of sets and may comprise more than three sets, each set preferably having a carrier frequency different from that of each of the other sets.

In one example, the sets of transducers are disposed according to a distribution generally nested by order of height of carrier frequency. For example, the transducers are disposed according to a generally concentric arrangement by order of size of the active membranes, the set having the smallest active membrane, in other words emitting at the highest frequency, being for example situated in the center. Other arrangements are possible, for example an alternation of sets of transducers with different carrier frequencies in one or two directions, or sets of transducers situated at different levels, or pointing in different directions.

Preferably, the interface comprises a detection system configured for detecting the position, relative to the transducers, of at least one region to be stimulated for touch, the control circuit being arranged for controlling the transducers, and notably the position of the first and second focal regions, as a function of the position of the region of the user thus detected. The detection system may use for this detection at least a part of the ultrasonic transducers, by analyzing the return signal reflected on the user, in the manner of a sonar. The detection system may also use any other system, for example optical or capacitive, adapted to this detection.

The detection system may be used, where appropriate, in order to allow the interface to go from a standby state to an active state, or vice versa.

Each transducer may be of any type, piezoelectric, ferroelectric, electromagnetic, thermal, where these materials may be deposited as thin layers or formed from ceramic piezoelectric materials. Preferably, the transducer is of the piezoelectric micro-machined ultrasonic transducer (PMUT) type, this type of transducer being suitable for the simultaneous fabrication of a large number of transducers.

The transducers emit for example within a 20 kHz-150 kHz carrier frequency range and, more generally, any frequency range higher than the audible range.

A further subject of the invention is a method for generating at least one 'mid-air' touch sensation on a user using an interface according to the invention, such as defined above, this method comprising the step consisting in:
 modulating by virtue of a control circuit the control signals sent to the transducers in order to:
  generate, with the ultrasound waves emitted by at least a part of the transducers of the first set, an acoustic pressure detectable by touch within at least a first focal region, and
  generate, with the ultrasound waves emitted by at least a part of the transducers of the second set, an acoustic pressure detectable by touch within at least a second focal region.

The method may comprise the step consisting in detecting the presence of the user by virtue of a detection system and identifying the location where the touch sensation is to be generated.

Depending on the effect sought, the acoustic pressures detectable by touch may be generated simultaneously at the first focal region and at the second focal region. They may also be generated successively at the first focal region and at the second focal region.

In one example, a touch sensation of a first surface is generated at the first focal region and a touch sensation of a second surface is generated at the second focal region, in such a manner that the sensation of the second surface gives the impression to the user that it is smaller than the first surface.

In other embodiments, a touch sensation of a first surface is generated at the first focal region and a touch sensation of a second surface is generated at the second focal region, in such a manner that the perception of the second surface gives the impression to the user that it is situated further away than the first surface.

The transducers of the first set may emit at a carrier frequency that is lower than the carrier frequency at which the transducers of the second set are emitting, a touch sensation of a first surface is generated at the first focal region and a touch sensation of a second surface is generated at the second focal region, in such a manner that the perception of the first surface gives the impression to the user that it is situated further away and/or is bigger than the second surface.

In other words, the transducers emitting at the lowest carrier frequency may be used to generate the haptic effect furthest away and/or the touch sensation of a pattern with the least resolution, in other words the largest, and the transducers emitting at the highest carrier frequency may be used to generate the nearest haptic effect and/or the touch sensation of a smaller pattern.

Yet another subject of the invention is a method for fabricating matrices of transducers of the PMUT type, used in an interface according to the invention such as defined above, comprising the steps consisting in:
 depositing at least a first layer of a material for forming the membranes of the transducers on the upper face of a substrate, preferably rigid, the substrate being for example made of silicon,
 depositing at least one piezoelectric stack on said at least a first layer for formation of the membranes, notably based on the succession of deposition and etching of electrode materials and of piezoelectric material,
 forming a plurality of transducers on the substrate by masking and etching of the layers previously deposited,
 cutting out the substrate by masking and etching in order to expose the lower face of the membrane of each transducer, and
 electrically connecting each transducer to the control circuit, notably by virtue of flexible connectors or connectors passing through the substrate.

Preferably, at least the first and second sets of transducers are thus formed on the same substrate.

The invention will be better understood upon reading the detailed description that follows of non-limiting exemplary embodiments of the latter, and upon examining the appended drawing, in which:

DETAILED DESCRIPTION

Figure 1:
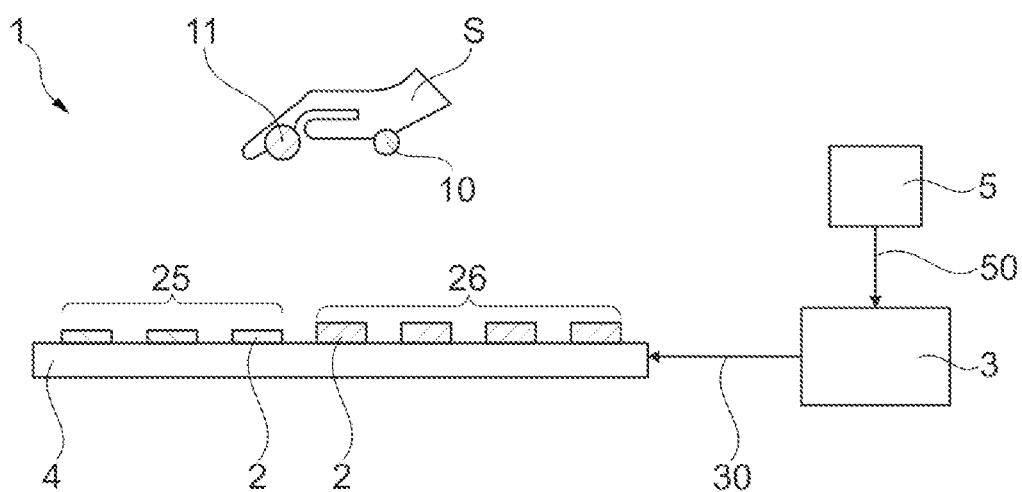
FIG. 1 shows a partial and schematic view of one example of a haptic interface of the 'mid-air' type according to the invention, FIG. 2 schematically illustrates the principle of focusing of the ultrasound waves by adjusting the phase shift.

One example of a haptic interface 1 according to the invention is illustrated schematically in FIG. 1.

The interface 1 comprises a plurality of ultrasonic transducers 2, for example carried by the same substrate 4, and a control circuit 3.

The plurality of transducers 2 comprises a first set 25 of transducers emitting at a first ultrasound carrier frequency and a second set 26 of transducers emitting at a second ultrasound carrier frequency, different from the first.

The control circuit 3 is configured for modulating the signals 30 sent to the transducers 2 in order to generate, with the ultrasound waves emitted by the first set of transducers, an acoustic pressure detectable by touch on a surface S, defined for example by the palm and/or the fingers of one hand, within a first focal region 10, and, with the ultrasound waves emitted by the second set of transducers, an acoustic pressure detectable by touch via the surface S within a second focal region 11. Each focal region exhibits spatial characteristics notably depending on the carrier frequency of the set of transducers responsible for the corresponding acoustic pressure.

The focal regions 10 and 11 may be localized at separate places of the surface S or may overlap, at least partially. They may or may not be of different sizes.

In the example considered, the interface 1 furthermore comprises a detection system 5 configured for detecting the position of the surface S to be stimulated by touch and for transmitting corresponding localization data 50 to the control circuit 3. The interface 1 is said to be of the 'mid-air' type because the surface S to be stimulated by touch is remote from the transducers 2, and the focal regions 10 and 11 are situated in the air at a distance from the transducers, being visually invisible to the user.

Figure 2:
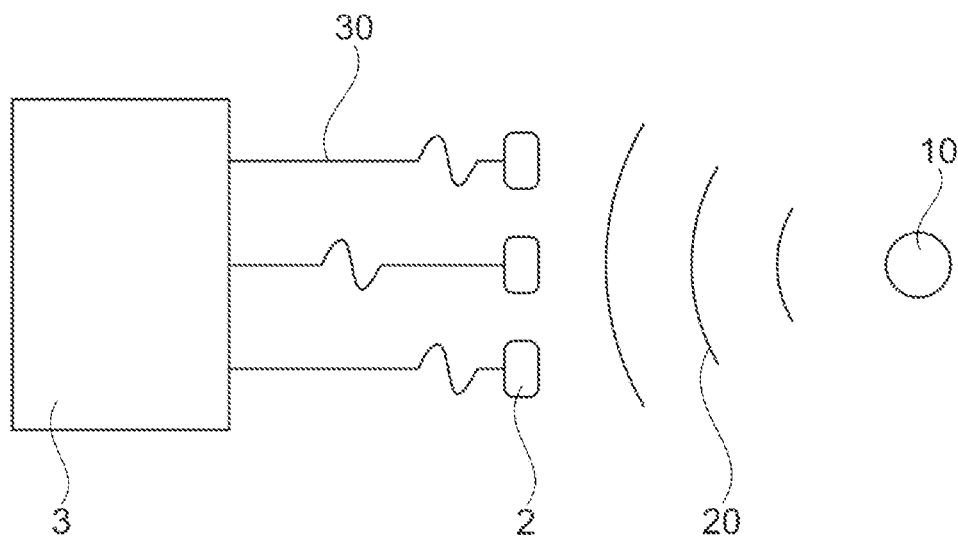

The acoustic pressures detectable by touch are generated according to a principle known as 'electronic acoustic focusing', known from the prior art and illustrated schematically in FIG. 2.

In order to concentrate the ultrasound waves 20 emitted by the transducers 2 of the same set of transducers into a predefined focal region 10, in a manner known per se, the control circuit 3 sends complex alternating signals 30 to the transducers 2 in order to introduce phase shifts between the various ultrasound waves emitted by the transducers 2 actuated, thus generating the desired wavefront shape, this wavefront shape resulting in an increase of the acoustic pressure within the focal region 10.

Figure 3:
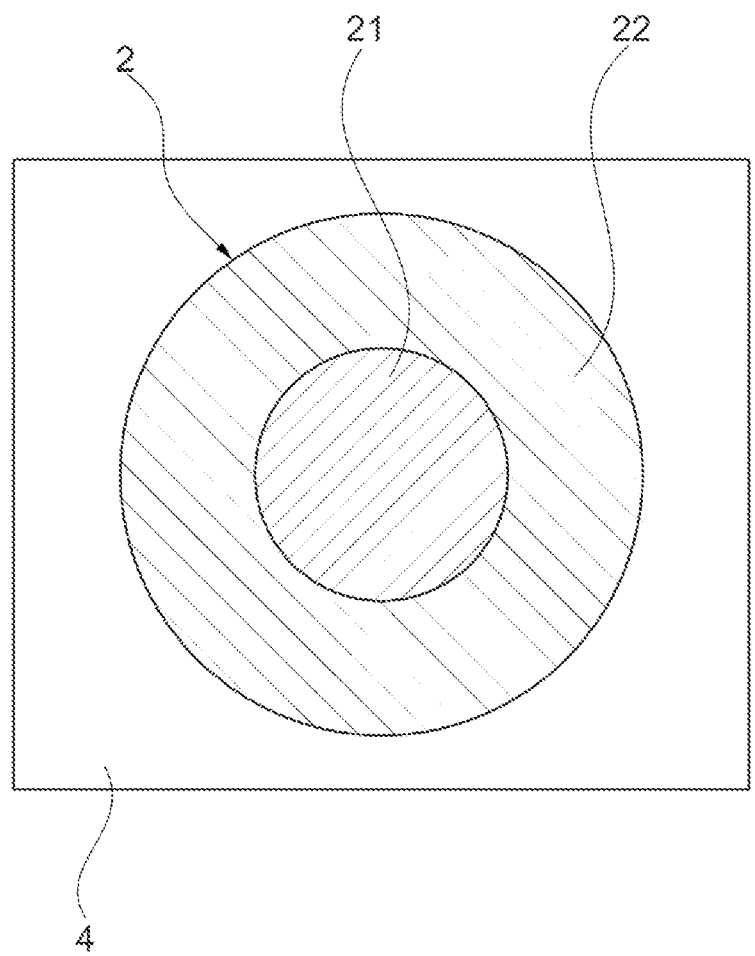
FIG. 3 is a partial and schematic top view of one example of an ultrasonic transducer.

FIG. 3 shows one example of a transducer 2 carried by a substrate 4. The transducer 2 comprises for example a piezoelectric actuator 21 and an active membrane 22 set into vibration by the actuator 21.

In the example considered, the active membrane 22 has a circular shape. In other embodiments, the active membrane 22 has a non-circular shape, for example polygonal, notably square, rectangular, or any other appropriate shape, 2D or 3D, where the membrane may have a convex or concave shape. The radius of the piezoelectric actuator 21 is for example around 50% of the radius of the active membrane 21, this ratio being advantageous for a correct deformation of the membrane, as described in the article by Casset, F., et al. "Piezoelectric membrane actuator design." (2011 12th Intl. Conf. on Thermal, Mechanical & Multi-Physics Simulation and Experiments in Microelectronics and Microsystems. IEEE, 2011).

Within each set of transducers, the latter are identical and consequently emit at the same carrier frequency. From one set to the other, the transducers 2 differ for example in their dimension, each dimension corresponding to a respective carrier frequency. The active membrane 22 of the transducers 2 varies for example in thickness and/or in radius, preferably in radius, from one set to another.

The transducers of the various sets of the interface according to the invention may be disposed within one or more matrices 40. The term 'matrix' denotes a single-piece structure carrying several transducers, identical or otherwise. A matrix may comprise transducers which have been fabricated simultaneously, as detailed hereinbelow.

Figure 4:
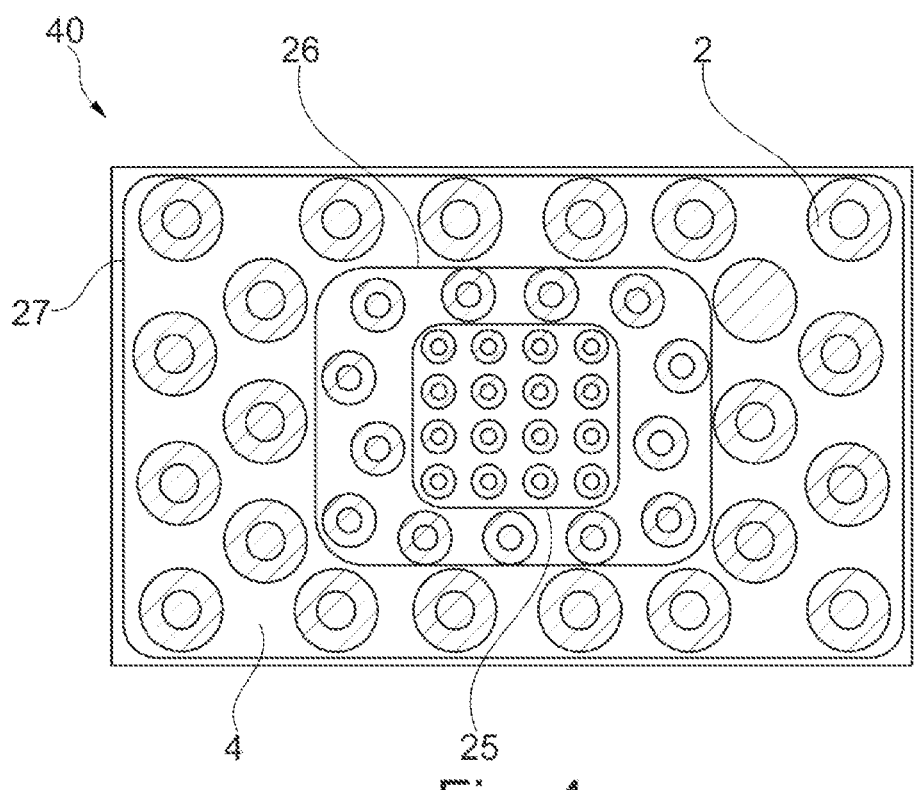
FIG. 4 shows a partial and schematic view of one exemplary embodiment of a matrix of transducers comprising transducers of different sizes.

FIG. 4 shows a matrix 40 of ultrasonic transducers 2 comprising three sets 25, 26 and 27 of transducers with different respective sizes, the transducers 2 being disposed on the substrate 4 according for example to a concentric distribution, as illustrated. For example, the set 25 corresponds to that comprising the transducers 2 of smallest size, disposed at the center of the matrix, the set 26 to that comprising the transducers 2 of intermediate size, and the set 27 to that comprising the transducers 2 of largest size, distributed on the periphery of the matrix.

The active membranes 22 of the transducers 2 of the sets 25, 26 and 27 have for example radii of 1000, 1600 and 2200 micrometers, respectively. The carrier frequency f corresponding to a given size of membrane may be estimated by virtue of the following equation, coming from the article by Nguyen, M. D., et al. "Optimized electrode coverage of membrane actuators based on epitaxial PZT thin films." (Smart materials and structures 22.8 (2013): 085013.):

$$f = \frac{\lambda_n^2 t}{2\pi r^2} \sqrt{\frac{E}{12\rho(1-v)}}$$

with E and v the Young's modulus and the Poisson coefficient of the membrane, respectively, ρ its average density, t its thickness and r its radius. $\lambda_n$ is the resonance eigenvalue of the membrane with n the mode of resonance.

In the example considered, the carrier frequencies of the transducers 2 of the sets 25, 26 and 27 are thus approximately 107 kHz, 44 kHz and 22 kHz, respectively. According to these frequencies, the haptic effect may be generated at a distance of the order of 10 cm to 1 m.

The transducers of various sets may be disposed within the same matrix 40 in various ways, for example in a generally concentric fashion as illustrated in FIG. 4, or else mixed randomly or complying with other rules for disposition of the transducers relative to one another.

Figure 5A:
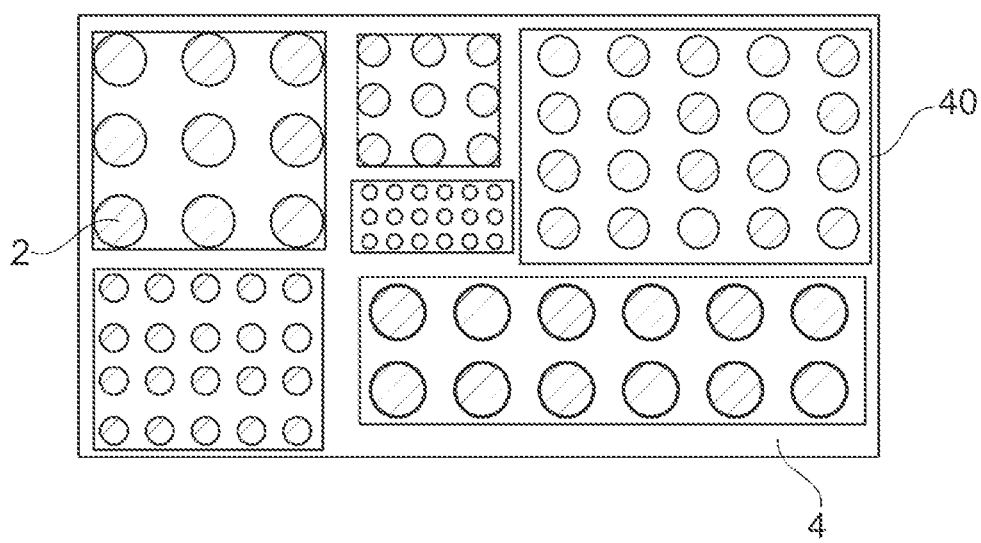
FIG. 5a shows a partial and schematic view of one exemplary embodiment of an assembly of matrices of transducers.
Figure 5B:
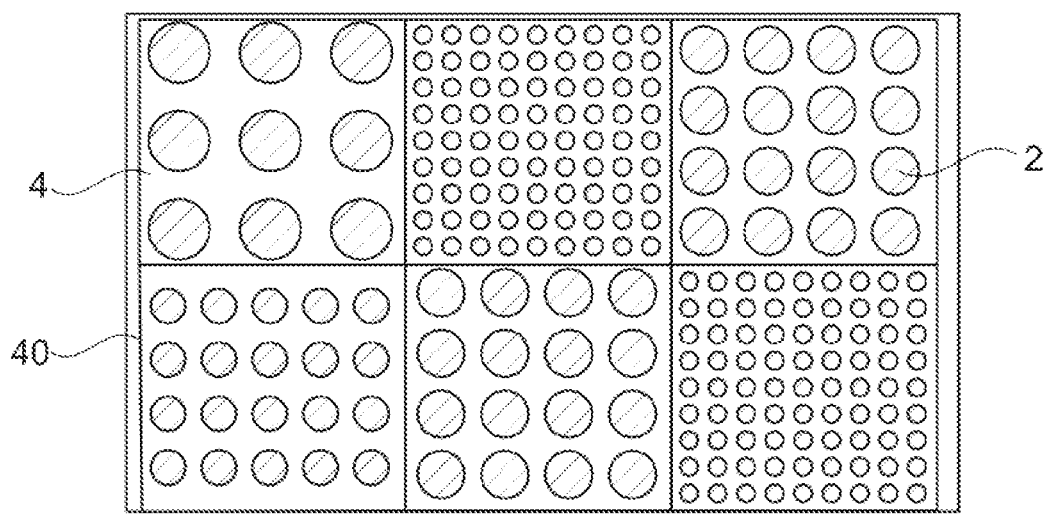
FIG. 5b shows a partial and schematic view of another exemplary embodiment of an assembly of matrices of transducers.
Figure 5C:
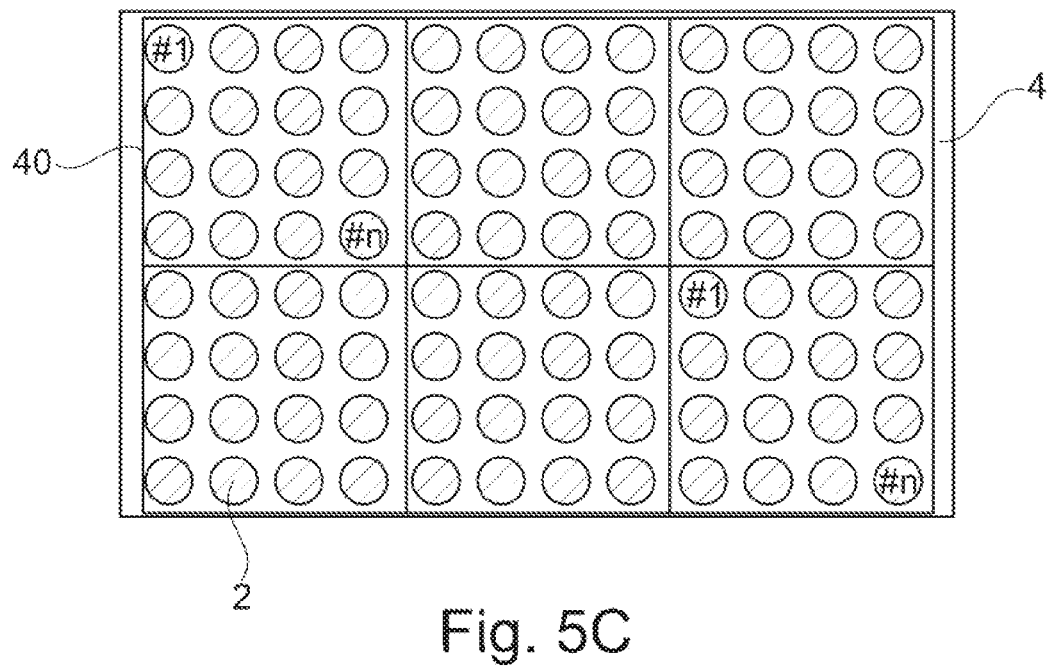
FIG. 5c shows a partial and schematic view of another exemplary embodiment of an assembly of matrices of transducers.

In other embodiments, as illustrated for example in FIGS. 5a, 5b and 5c, the sets are disposed on respective separate matrices 40 which are for example grouped, the matrices 40 being for example assembled in the same plane. The matrices 40 may be of different shapes and sizes, such as in FIG. 5a, or of similar size such as in FIG. 5b. The membranes 22 of the transducers 2 of each matrix 40 may differ in thickness, such as illustrated in FIG. 5c, the carrier frequency varying with the thickness.

The dimensioning of the matrix or matrices 40 of transducers 2 depends on the desired haptic effect(s).

It is possible to estimate the number of transducers needed based on the acoustic pressure that it is desired to generate and on its localization. For example, for transducers having a radius of active membrane of the order of 1000 micrometers, a haptic effect able to be sensed by the finger, corresponding to an acoustic pressure of 198 Pa, may be obtained at a distance of 0.2 m with around 550 transducers. This acoustic pressure is the sum of the unitary acoustic pressures generated by each transducer. The unitary acoustic pressure P generated by a transducer may be calculated from the surface area $S_m$ of its membrane, from its carrier frequency f and from the distance d at which it is generated, by using the following equation of the acoustic pressure coming from a plane piston:

$$P = \frac{\sqrt{2} \cdot \pi \cdot \rho \cdot S_m \cdot \epsilon \cdot f^2}{d}$$

with ρ the average density of the membrane and E the amplitude of the vibration.

In a similar manner to the preceding calculation, it is possible to generate at the same distance of 0.2 m a haptic effect able to be sensed by the finger, corresponding to an acoustic pressure of 199 Pa, with 700 transducers having a membrane radius of the order of 1600 micrometers. Around 900 transducers with a membrane radius of 2200 micrometers may be used to generate an acoustic pressure of the same order at a similar distance.

It is possible to obtain in a simple manner haptic effects which would otherwise be relatively complex to obtain using the acoustic contributions of the transducers operating at the various carrier frequencies. This principle is illustrated in FIGS. 6a, 6b and 6c.

Figure 6A:
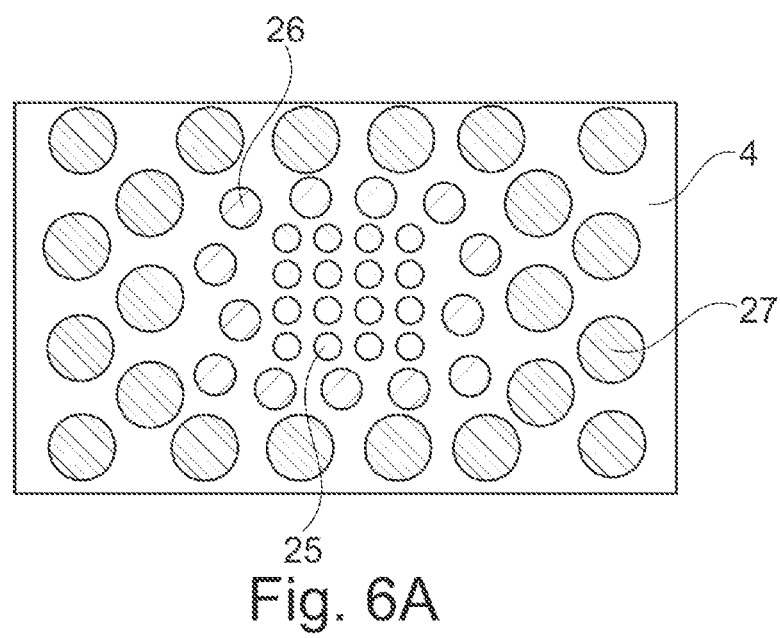
FIG. 6a illustrates a partial and schematic view of a matrix of transducers of different sizes that can generate various touch sensations.

As illustrated in FIG. 6a, a matrix 40 is for example used comprising three sets 25, 26 and 27 of transducers disposed according to a concentric distribution by order of size, from the smallest transducers (set 25) in the center to the largest transducers (set 27) at the periphery. The use of the transducers of various sizes, and hence carrier frequencies, allows haptic effects that are more or less localized to be simultaneously or successively generated, or a haptic effect to be complexified at one point in space. For example, the transducers 2 with the largest size, in other words emitting at the lowest carrier frequency (corresponding to the set 27 in the example considered), may be used to generate the haptic effect furthest away and/or the touch sensation of a pattern with the least resolution, in other words the largest. On the other hand, the transducers 2 with the smallest size, in other words emitting at the highest carrier frequency (corresponding to the set 25), may be used to generate the nearest haptic effect and/or the touch sensation of a smaller pattern.

Figure 6B:
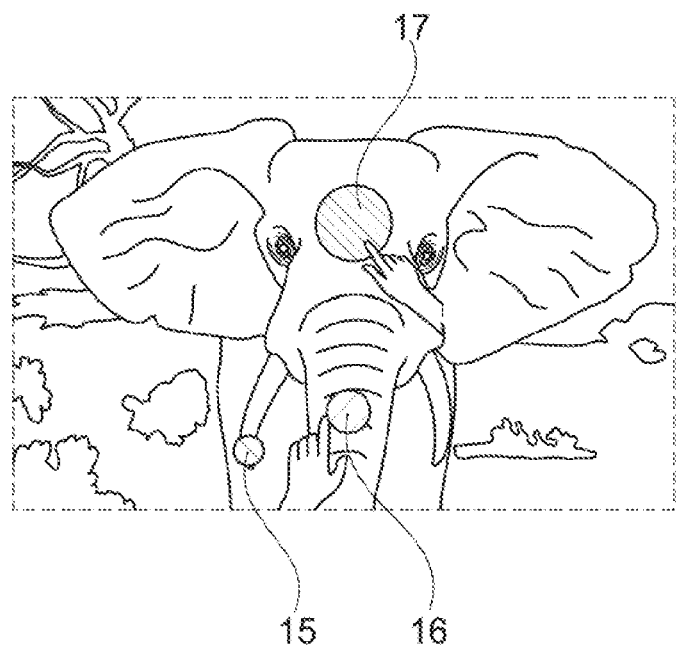
FIG. 6b illustrates a partial and schematic view of the possibility of generating various touch sensations using a matrix of transducers of different sizes.

In the example illustrated in FIG. 6b, the transducers of the set 27 generate for example a touch sensation 17 giving the impression to the user of touching the front of an elephant, whereas the transducers of the set 25 generate a touch sensation 15 giving the impression to the user of touching a smaller and more angular region of the same elephant, for example the tip of its tusk. The transducers of the set 26, of intermediate size, may generate a touch sensation 16 giving for example the impression to the user of touching the trunk of the elephant.

Figure 6C:
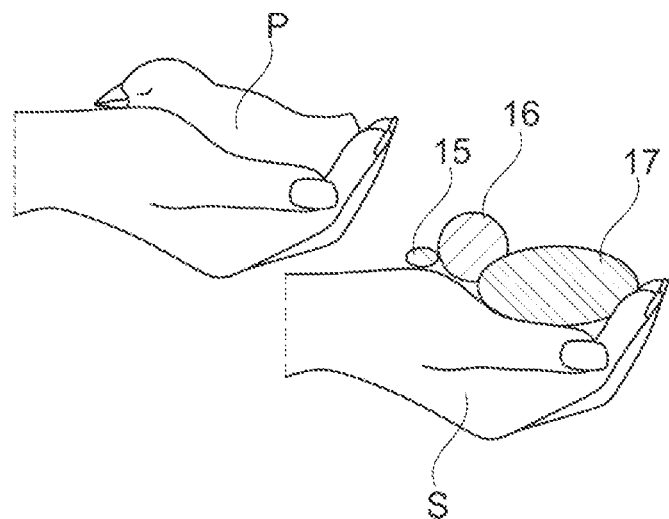
FIG. 6c illustrates a partial and schematic view of the possibility of generating other various touch sensations using a matrix of transducers of different sizes.

In another example, illustrated in FIG. 6c, the user may have the impression of holding a chick P in their hand by virtue of three haptic effects 15, 16 and 17 generated by the sets 25, 26 and 27, respectively, and reproducing virtually the touch sensations of the beak, of the head and of the body of the chick, respectively.

Figure 7:
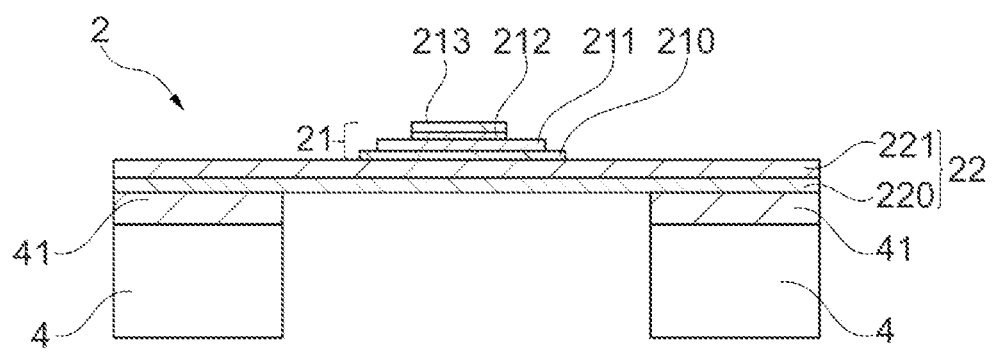
FIG. 7 is a partial and schematic cross section of one exemplary embodiment of an ultrasonic transducer of the PMUT type.

FIG. 7 shows one exemplary embodiment of a transducer 2 of the interface 1. In the example in question, the transducer 2 is of the micro-machined ultrasonic transducer (PMUT) type and comprises, as previously described, an active membrane 22 fixed onto a rigid substrate 4 and a piezoelectric actuator 21 disposed on the membrane 22.

The rigid substrate 4 is for example made of silicon. An insulating layer 41, for example made of silicon oxide, may be added between the substrate 4 and the membrane 22. The membrane 22 is fixed onto the substrate only by its periphery, its central part being free to flex.

The membrane 22 is formed of one or more superposed constitutive layers and has a total thickness for example in the range between 0.5 and 10 μm. In the example considered, the membrane 22 is composed of two superposed layers 220 and 221. The lower layer 220 is for example made of polysilicon and has a thickness of 4 μm. The upper layer 221 is for example made of silicon oxide and has a thickness of 1.9 μm.

The piezoelectric actuator 21 comprises for example four superposed layers 210, 211, 212 and 213. The layer 210 is in contact with the upper layer 221 of the membrane 22. The layer 210 is for example a layer of platinum and forms the lower electrode of the actuator 21. In this example, the upper electrode of the actuator comprises a layer 212, for example of ruthenium, and a conductor layer 213, for example of gold. The layer 211 situated between the two electrodes is a layer of piezoelectric or ferroelectric material, for example of lead zirconate titanate (PZT). It may also be a layer of aluminum nitride (AlN), of zinc oxide (ZnO) or any other suitable piezoelectric or ferroelectric material.

Figure 8:
FIG. 8 is a block diagram illustrating steps of one example of a method for fabricating a plurality of ultrasonic transducers of the PMUT type.

In order to obtain the PMUT transducer illustrated in FIG. 7, a method of fabrication comprising the steps shown in FIG. 8 may be implemented, allowing a large number of transducers to be fabricated simultaneously.

At the step 71, one or more layer(s), for example of polysilicon and silicon oxide, is/are deposited on the upper face of a rigid substrate 4, in order to form the active membranes 22 of the transducers. An insulating layer 41 may initially be deposited between the substrate 4 and the first layer of the membrane.

Figure 9:
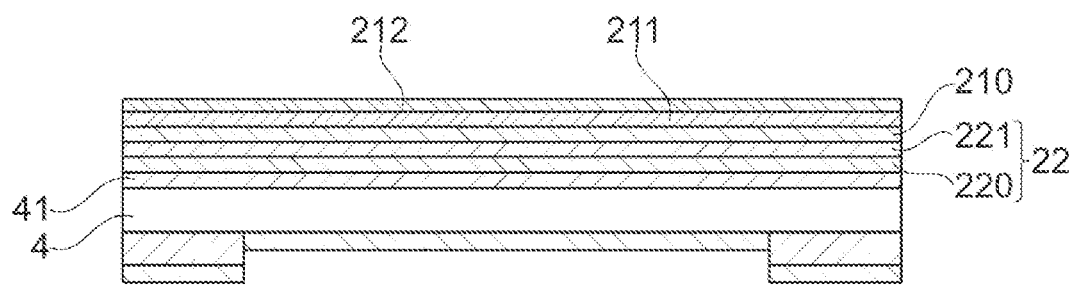
FIG. 9 is a partial and schematic cross section illustrating the second step in FIG. 8.

At the step 72, the materials that will form the piezoelectric actuators 21 are successively deposited in thin layers. The method starts for example by depositing a layer of platinum 210 so as to form the lower electrode, then it is covered with a layer 211 of a piezoelectric material of the PZT type, which is subsequently itself covered by a thin layer of ruthenium 212. At the end of the step 72 and as illustrated in FIG. 9, a continuous stack of the layers previously described is obtained, namely from bottom to top: the substrate 4, the insulating layer 41, the layers 220 and 221 forming the membrane 22, and the layers 210, 211 and 212 forming the piezoelectric actuator 21.

Figure 10:
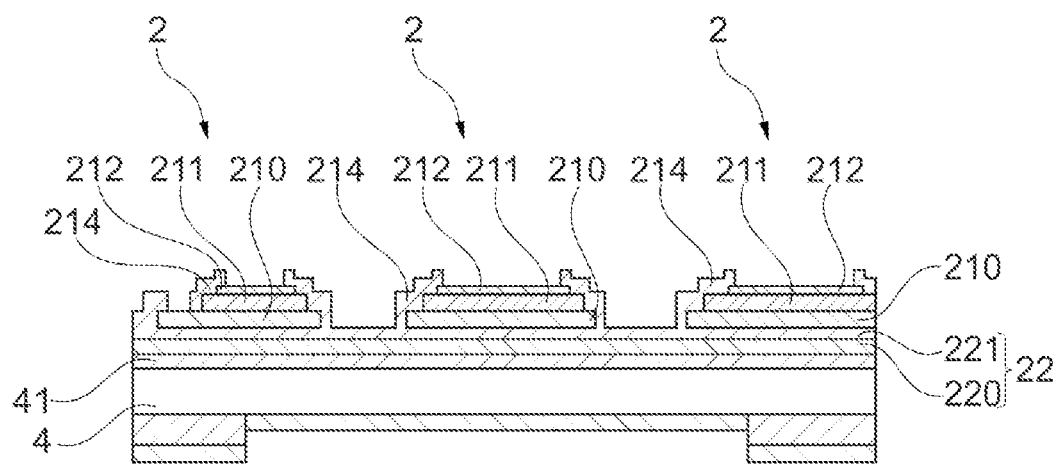
FIG. 10 is a partial and schematic cross section of the plurality of transducers of the PMUT type after the third step in FIG. 8.

Then, at the step 73, and as illustrated in FIG. 10, the plurality of transducers on the substrate 4 is formed by application of a mask and by etching the layers 210, 211 and 212 constituting the piezoelectric actuator. This step may furthermore comprise the application of an insulating passivation layer 214, for example of silicon oxide, and of a conducting layer 213, for example of gold, on at least a part of the layer 212.

Figure 11:
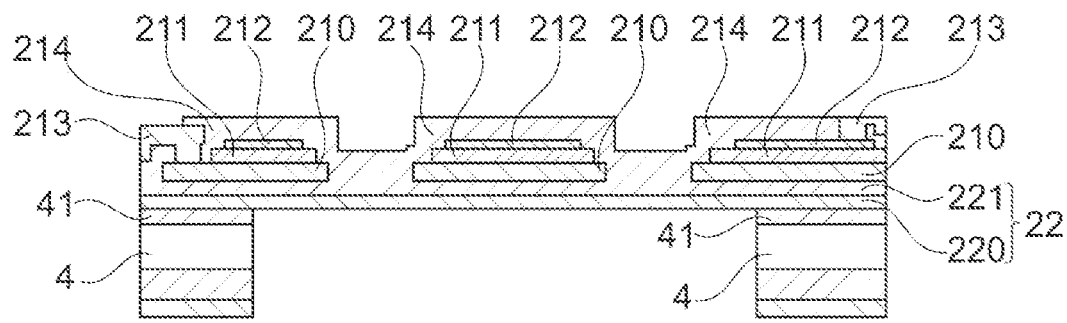
FIG. 11 is a partial and schematic cross section of the plurality of transducers of the PMUT type in FIG. 8 prior to the dicing by matrix.

At the step 74, the lower face of the substrate 4 and the insulating layer 41 are cut out, for example via the application of a mask then by etching, in such a manner as to expose the lower face of the central part of the active membrane 22 of each transducer such as illustrated in FIG. 11.

A plurality of transducers may thus be formed simultaneously in a simple fashion on the same substrate. At the step 75, the substrate may subsequently be cut up in order to obtain matrices 40 of transducers of the desired size. The size and the thickness of the membranes may be adjusted in order to obtain transducers of different frequencies.

At the step 76, each transducer is electrically connected to control electronics by virtue, for example, of through-connections 7.

In order to electrically connect the transducers thus obtained to their control electronics, flexible connectors may be connected to each of the transducers.

Figure 12:
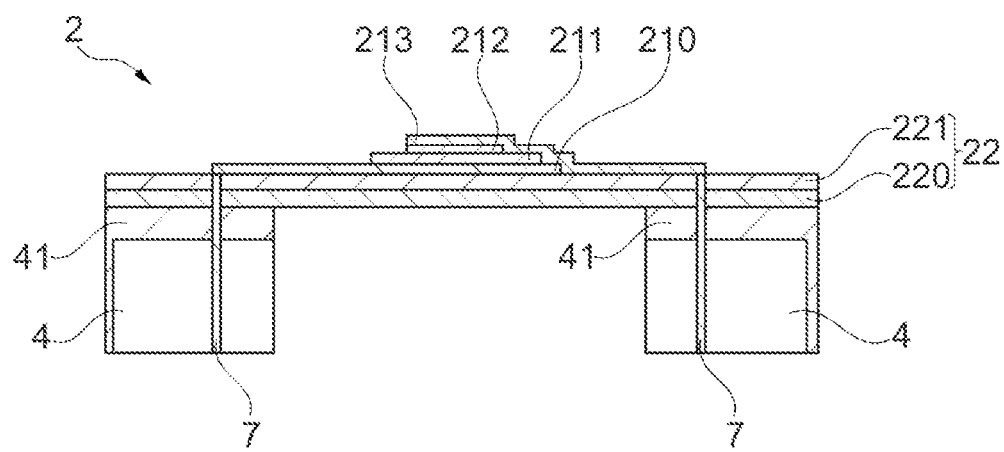
FIG. 12 is a partial and schematic cross section illustrating one example of electrical connection of the transducer in FIG. 7.

The matrices 40 thus obtained may subsequently be integrated into a packaging and the flexible connectors connected to the control electronics. Alternatively and as illustrated in FIG. 12, through-connections 7 may be used to bring electrical contacts onto the lower face of the substrate 4. The matrices 40 of transducers may then be directly integrated on the control electronics.

When a voltage difference is applied between the electrodes 210 and 213, the piezoelectric layer 211 can deform under the action of the electric field generated, causing a deformation of the active membrane 22 and the emission of an acoustic wave. Conversely, the transducer 2 thus connected can act as an acoustic wave receiver, for example as a system for detecting the surface S on which the haptic effect is to be generated. In this case, the reception of an acoustic wave deforms the layer 211 and hence the membrane 22, leading to a variation in the electric field which can be translated into an electrical signal on the electrodes, measured by virtue of the electrical connections 7.

Figure 13:
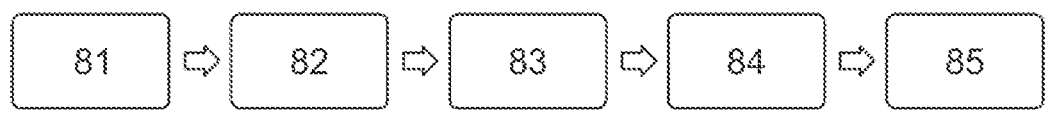
FIG. 13 is a block diagram illustrating one example of operation of the haptic interface according to the invention.

A haptic interface 1 according to the invention, coupled with a detection system 5, may operate according to the steps described in FIG. 13.

At the step 81, the haptic interface is for example in standby, in the absence of a user within the detection field of the detection system 5. At the step 82, the detection system 5, for example formed from a part of the transducers 2 or from any other suitable detection system, for example optical, detects the presence of a surface S of a user within the detection field and localizes the place where the haptic effect(s) is/are to be generated.

At the step 83, the control circuit 2 sends the appropriate control signals 30 to actuate at least a part of the transducers 2 in such a manner as to generate the desired haptic effects. At the step 84, the transducers emit ultrasound waves at different carrier frequencies, depending on the sets actuated, allowing one or more haptic effects to be generated within one or more focal regions, giving for example the impression to the user of touching larger or smaller surfaces, in motion and/or exhibiting features. At the step 85, the user moves out of the detection field and the interface 1 goes back into standby.

It goes without saying that the invention is not limited to the examples just described.

For example, the ultrasonic transducers may be of any type other than a PMUT, and may emit within any range of carrier frequency higher than the audible range.

The transducers may be fabricated other than by the method of fabrication described hereinabove. The active membranes are for example formed on a glass substrate or on a flexible polymer sheet. The piezoelectric actuator may be located in the center of the membrane or otherwise, in the form of a disk or of a ring or any other shape, and be of various size with respect to the size of the membrane. There may be several piezoelectric actuators on the same membrane, for example one in its center and one on the periphery. The transducers may be deposited as thin layers or transferred directly onto the membrane. As described previously, the transducers with different sized membranes may be disposed on the substrate according to any given distribution.

The ultrasound waves in the examples considered propagate in the air, but any type of medium may be considered, for example a liquid.

The haptic effects may be generated at various points located with respect to a predefined region of skin of a user, and/or at one or more fixed points in space, independently of the detection of a user, for example to give anyone entering into the region the impression of the presence of an obstacle. They may be generated on both hands of a user, simultaneously or otherwise, or on any other part of the body of the user.

The haptic effects may be generated in such a manner as to give the impression to a user of touching various textures.

The haptic interface may be connected to one or more system(s) generating a visual effect, for example at least one screen, mirror or hologram.

The invention claimed is:
1. A haptic interface of a 'mid-air' type, comprising:
a control circuit; and
a plurality of ultrasonic transducers connected to said circuit, which includes a first set of transducers emitting at a first ultrasound carrier frequency and at least a second set of transducers emitting at a second ultrasound carrier frequency different from the first, wherein the control circuit is configured to modulate signals sent to the transducers to:
generate, with ultrasound waves emitted by at least a part of the transducers of the first set, an acoustic pressure detectable by touch within at least a first focal region, and
generate, with ultrasound waves emitted by at least a part of the transducers of the second set, an acoustic pressure detectable by touch within at least a second focal region,
a size of and/or materials of the second set of transducers differ from a size of and/or materials of the first set of transducers, and
the first set of transducers and the second set of transducers emit within a 20 kHz-150 kHz carrier frequency range.

2. The interface according to claim 1, wherein the first and second carrier frequencies are separated by at least 10 kHz.

3. The interface according to claim 1, wherein
the transducers of the first set are grouped according to one or more subsets, and
the transducers of the second set are grouped according to one or more subsets.

4. The interface according to claim 1, wherein the transducers of the first and the transducers of the second set are carried by a same substrate.

5. The interface according to claim 1, further comprising at least a third set of transducers emitting at an ultrasound carrier frequency different from frequencies of the first and second sets.

6. The interface according to claim 1, wherein the sets of transducers are disposed according to a generally concentric arrangement by order of height of carrier frequency, the set emitting at the highest carrier frequency being disposed in the center.

7. The interface according to claim 1, further comprising a detection system configured for detecting a position relative to the transducers of at least one surface to be stimulated for touch, the control circuit being arranged for controlling the transducers as a function of the position of the surface of a user thus detected.

8. The interface according to claim 1, each transducer of a set is a piezoelectric, ferroelectric, electromagnetic, thermal or ceramic piezoelectric type.

9. A method for generating at least one mid-air touch sensation on a user using a haptic interface of a 'mid-air' type, comprising a control circuit, and a plurality of ultrasonic transducers connected to said circuit, which includes a first set of transducers emitting at a first ultrasound carrier frequency and at least a second set of transducers emitting at a second ultrasound carrier frequency different from the first, the first set of transducers and the second set of transducers emitting within a 20 kHz-150 kHz carrier frequency range, wherein a size of and/or materials of the second set of transducers differ from a size of and/or materials of the first set of transducers, the method comprising:
modulating by virtue of a control circuit control signals sent to the transducers to:
generate, with ultrasound waves emitted by at least a part of the transducers of the first set, an acoustic pressure detectable by touch within at least a first focal region, and
generate, with ultrasound waves emitted by at least a part of the transducers of the second set, an acoustic pressure detectable by touch within at least a second focal region.

10. The method according to claim 9, wherein a touch sensation of a first surface is generated at the first focal region and a touch sensation of a second surface is generated at the second focal region, in such a manner that the sensation of the second surface gives an impression to a user that the second surface is smaller than the first surface.

11. The method according to claim 9, wherein a touch sensation of a first surface is generated at the first focal region and a touch sensation of a second surface is generated at the second focal region, in such a manner that a perception of the second surface gives an impression to a user that the second surface is situated further away than the first surface.

12. The method according to claim 9, wherein
the first ultrasound carrier frequency is lower than the second ultrasound carrier frequency, a touch sensation of a first surface is generated at the first focal region, and a touch sensation of a second surface is generated at the second focal region, in such a manner that a perception of the first surface gives an impression to a user that the first surface is situated further away and/or is bigger than the second surface.

13. A method for fabricating matrices of transducers of a piezoelectric micro-machined ultrasound transducer (PMUT) type of a haptic interface of a 'mid-air' type, comprising a control circuit, and a plurality of ultrasonic transducers connected to said circuit, which includes a first set of transducers emitting at a first ultrasound carrier frequency and at least a second set of transducers emitting at a second ultrasound carrier frequency different from the first, the first set of transducers and the second set of transducers emitting within a 20 kHz-150 kHz carrier frequency range, wherein the control circuit is configured to modulate signals sent to the transducers to generate, with ultrasound waves emitted by at least a part of the transducers of the first set, an acoustic pressure detectable by touch within at least a first focal region, and generate, with ultrasound waves emitted by at least a part of the transducers of the second set, an acoustic pressure detectable by touch within at least a second focal region, and a size of and/or materials of the second set of transducers differ from a size of and/or materials of the first set of transducers, the method comprising:
depositing at least a first layer of a material for forming membranes of the transducers on an upper face of a substrate;
depositing at least one piezoelectric stack on said at least a first layer for formation of the membranes, based on a succession of deposition and etching of electrode materials and of piezoelectric material;
forming a plurality of transducers on the substrate by masking and etching of the layers previously deposited;
cutting out the substrate by masking and etching in order to expose a lower face of a membrane of each transducer; and
electrically connecting each transducer to the control circuit, notably by virtue of flexible connectors or connectors passing through the substrate.

14. The method according to claim 13, wherein at least the first and second sets of transducers are fabricated on the same substrate.

* * * * *